US012799311B2

(12) United States Patent
Yang et al.

(10) Patent No.: US 12,799,311 B2
(45) Date of Patent: Nov. 17, 2026

(54) SYNTHETIC LEATHER

(71) Applicant: Dow Global Technologies LLC, Midland, MI (US)

(72) Inventors: Yunfeng Yang, Shanghai (CN); Xuejun Liu, Shanghai (CN); Hong Yang, Shanghai (CN); Lisa S. Madenjian, Lake Jackson, TX (US)

(73) Assignee: Dow Global Technologies LLC, Midland, MI (US)

(*) Notice: Subject to any disclaimer, the term of this patent is extended or adjusted under 35 U.S.C. 154(b) by 157 days.

(21) Appl. No.: 18/285,347

(22) PCT Filed: Apr. 9, 2021

(86) PCT No.: PCT/CN2021/086150
§ 371 (c)(1),
(2) Date: Oct. 2, 2023

(87) PCT Pub. No.: WO2022/213359
PCT Pub. Date: Oct. 13, 2022

(65) Prior Publication Data
US 2024/0199864 A1 Jun. 20, 2024

(51) Int. Cl.

| | |
|---|---|
| ***B32B 27/06*** | (2006.01) |
| ***B32B 27/12*** | (2006.01) |
| ***B32B 27/32*** | (2006.01) |
| ***C08L 23/0807*** | (2025.01) |
| ***D06N 3/04*** | (2006.01) |

(52) U.S. Cl.
CPC ........ *C08L 23/0815* (2013.01); *B32B 27/065* (2013.01); *B32B 27/32* (2013.01); *D06N 3/045* (2013.01); *B32B 2250/242* (2013.01); *B32B 2266/025* (2013.01); *B32B 2307/536* (2013.01); *B32B 2307/72* (2013.01); *D06N 2209/1642* (2013.01); *D06N 2213/02* (2013.01)

(58) Field of Classification Search
CPC ....... B32B 27/065; B32B 27/32; B32B 27/12; B32B 2250/242; B32B 2266/025; C08L 23/0815
See application file for complete search history.

(56) References Cited

U.S. PATENT DOCUMENTS 5,061,572 A 10/1991 Hamada et al.
8,674,022 B2 * 3/2014 Krabbenborg ....... D06N 3/0097 525/88
10,738,185 B2 8/2020 Tuberquia et al.
10,875,992 B2 12/2020 Wu et al.
11,661,488 B2 5/2023 Chen et al.
(Continued)

FOREIGN PATENT DOCUMENTS

CN 101096421 A 1/2008
CN 103328564 A 9/2013
(Continued)

*Primary Examiner* — Joanna Pleszczynska
(74) *Attorney, Agent, or Firm* — Boyle Fredrickson S.C.

(57) ABSTRACT

An article is provided and includes (A) a top layer composed of a composition composed of (i) from 70 wt % to 88 wt % of an ethylene-based polymer, and (ii) from 12 wt % to 30 wt % of an oil, based on the total weight of the top layer. The article further includes (B) a bottom layer composed of a textile.

16 Claims, 1 Drawing Sheet

(56) References Cited

U.S. PATENT DOCUMENTS

| | | | | |
|---|---|---|---|---|
| 2013/0237655 | A1* | 9/2013 | Chen | C08L 23/10 525/88 |
| 2015/0025165 | A1 | 1/2015 | Chen et al. | |
| 2016/0053096 | A1 | 2/2016 | Lee | |

FOREIGN PATENT DOCUMENTS

| | | | |
|---|---|---|---|
| CN | 105283502 | A | 1/2016 |
| JP | H04-174698 | A | 6/1992 |
| JP | 2011-105835 | A | 6/2011 |
| WO | 2020042140 | A1 | 2/2016 |

* cited by examiner

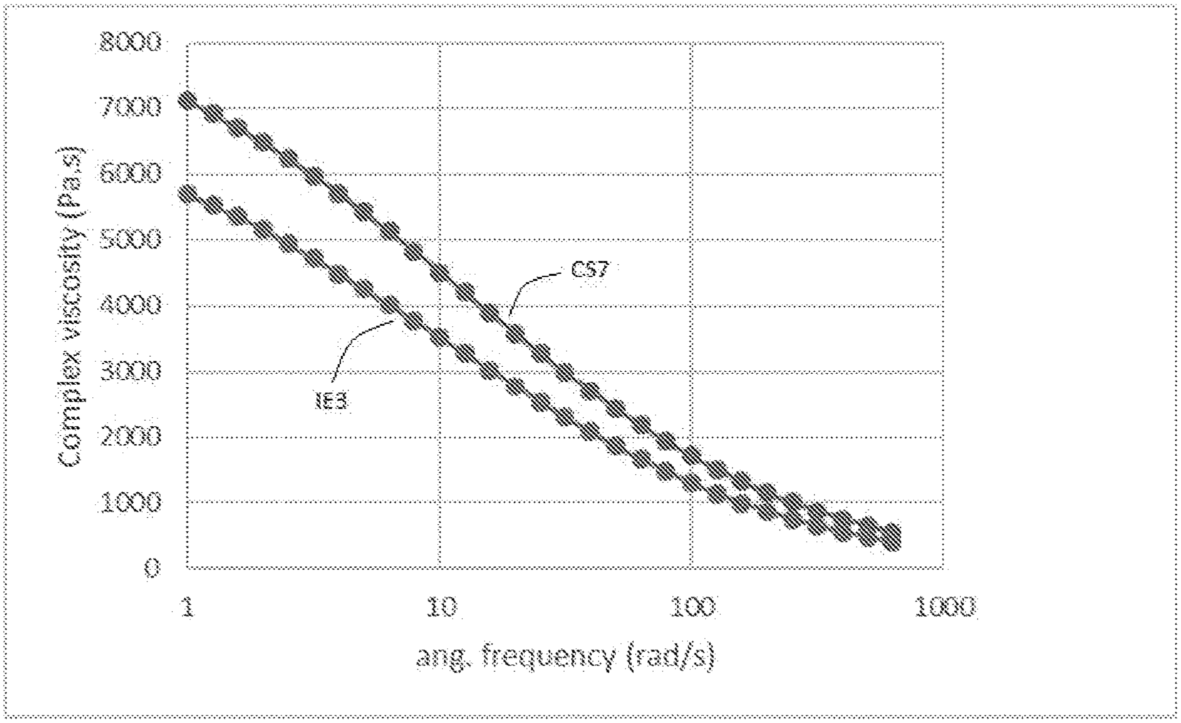
8000
7000
6000
5000
4000
3000
2000
1000
0
1
10
100
1000
Complex viscosity (Pa.s)
ang. frequency (rad/s)
CS7
IE3

SYNTHETIC LEATHER

BACKGROUND

The applications for synthetic leather continue to grow. Synthetic leather is used to produce clothing, footwear, bags and luggage, home upholstery, and automobile seats. Synthetic leather exhibits similar performance and handfeel when compared to natural leather. Synthetic leather provides the added advantage of being animal-friendly and is less expensive to produce compared to natural leather.

Conventional synthetic leathers have drawbacks. The production of polyurethane-based synthetic leather (PU-leather) requires the use of organic solvent, typically dimethyl formamide (DMF), in order to form the polyurethane synthetic leather matrix. DMF is hazardous to manufacturers, processors, consumers, and the environment.

Polyvinyl chloride synthetic leather (PVC-leather) requires halogenated polymer and plasticizer, typically phthalate-based plasticizer. Halogenated polymer and phthalate-based plasticizer each is hazardous to manufacturers, processors, consumers, and the environment.

Polyolefin elastomer based synthetic leather (POE-leather) is advantageous because it is halogen-free, it is phthalate-free, and the production of POE-leather does not require the use of harmful solvent, such as DMF. POE-leather has the added benefit of recyclability due to its thermoplastic nature. From the point of view of performance, POE has excellent weatherability and low temperature flexibility, and is resistant to hydrolysis and is resistant to yellowing. In addition, POE-leather finds favor in the trend for lightweighting that is presently occurring in the luggage/bag, shoe and automotive interior segments as POE-leather has a lower density compared to the density for each of PU-leather and PVC-leather.

Consequently, the art recognizes the need for POE-leather. The art further recognizes the need for POE-leather with bally flex resistance performance and softness that meets, or exceeds, the bally flex resistance performance and softness for PU-leather and/or PVC-synthetic leather.

SUMMARY

The present disclosure provides an article. In an embodiment, an article is provided and includes (A) a top layer composed of a composition composed of (i) from 70 wt % to 88 wt % of an ethylene-based polymer, and (ii) from 12 wt % to 30 wt % of an oil, based on the total weight of the top layer. The article further includes (B) a bottom layer composed of a textile.

BRIEF DESCRIPTION OF THE DRAWINGS

FIG. 1 is a Dynamic Mechanical Spectroscopy graph comparing Inventive Example 3 (IE3) to comparative sample 7 (CS7).

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower value and the upper value. For ranges containing explicit values (e.g., a range from 1, or 2, or 3 to 5, or 6, or 7) any subrange between any two explicit values is included (e.g., the range 1-7 above includes subranges from 1 to 2; from 2 to 6; from 5 to 7; from 3 to 7; from 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination.

An "ethylene-based polymer," as used herein is a polymer that contains more than 50 weight percent polymerized ethylene monomer (based on the total amount of polymerizable monomers) and, optionally, may contain at least one comonomer.

"Fabric" is a woven or non-woven (such as knitted) structure formed from individual fibers or yarn.

"Fiber" and like terms refer to an elongated column of entangled filaments. Fiber diameter can be measured and reported in a variety of fashions. Generally, fiber diameter is measured in denier per filament. Denier is a textile term which is defined as the grams of the fiber per 9000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers.

"Filament" and like terms refer to a single, continuous strand of elongated material having generally round cross-section and a length to diameter ratio of greater than 10.

The term "foam," or "foam article," as used herein, is a structure constructed from a polymer; the structure comprises a plurality of discrete gas pockets, or foam cells, completely surrounded by polymer. The term "foam cell," or "cell," as used herein, is a discrete space within the foam composition. The foam cell is separated, or otherwise is defined, by membrane walls composed of the polymer of the foam composition.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

"Nonwoven" refers to a web or a fabric having a structure of individual fibers or threads which are randomly interlaid, but not in an identifiable manner as is the case of a knitted fabric.

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer.

"Styrene" has the Structure A below. A "styrenic-based polymer" is a polymer containing polymerized styrene as a monomer.

Structure A

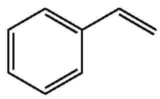

"Woven" refers to a web or a fabric having a structure of individual fibers or threads which are interlaid in a pattern in an identifiable manner. A nonlimiting example of a woven fabric is a knitted fabric.

Test Methods

Bally flexibility test is performed in accordance with ASTM D6182 at 25° C. The bally flex test determines the durability of coatings applied to synthetic leather, leather and fabrics by repeatedly flexing the specimen. The Bally Flexometer conforms to DIN 53351, and operates at a rate of 100 cycles/minute. The ending cycle is determined by the cycle at which the plaque surface cracks and is reported as the bally flex result. Two specimens were tested for each sample and the average value was reported as the bally flex resistance value. Results are reported in the number of cycles. If no crack/damage is found after 100,000 cycles for the two specimens, the result is reported as "greater than 100,000 or ">100k."

Density is measured in accordance with ASTM D792, Method B. The result is recorded in grams per cubic centimeter (g/cc).

Differential Scanning Calorimetry (DSC). Differential Scanning Calorimetry (DSC) can be used to measure the melting, crystallization, and glass transition behavior of a polymer over a wide range of temperature. For example, the TA Instruments Q2000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −80° C. at a 10° C./minute cooling rate and held isothermal at −80° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=(($H_f$)/292 J/g)×100.

The heat of fusion ($H_f$) (also known as melt enthalpy) and the peak melting temperature are reported from the second heat curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Dynamic Mechanical Spectroscopy (DMS) is measured on compression molded disks formed in a hot press at 180° C. at 10 MPa pressure for 5 minutes and then water cooled in the press at 90° C./min. Testing is conducted using an AR2000ex rheometer (TA instruments, Geometry: 25 mm parallel plate, Frequency sweep, Temperature: 160° C., Angular frequency: 1~628 rad/s, Strain: 5%) equipped with dual cantilever fixtures for torsion testing.

Melt index (MI or $I_2$) (for ethylene-based polymers) is measured in accordance with ASTM D 1238, Condition 190° C./2.16 kg with results reported in grams per 10 minutes (g/10 min).

Shore A hardness was measured in accordance with ASTM D2240. Load 1 kg, duration time 5 seconds. Two 3 mm thick plaques were stacked together for the test.

DETAILED DESCRIPTION

The present disclosure provides an article. In an embodiment, the article includes (A) a top layer composed of a composition composed of (i) from 70 wt % to 88 wt % of an ethylene-based polymer, and (ii) from 12 wt % to 30 wt % of an oil, based on the total weight of the top layer. The article also includes (B) a bottom layer composed of a textile.

A. Top layer

(i) Ethylene-Based Polymer

The top layer is composed of a composition that includes (i) from 70 wt % to 88 wt % of an ethylene-based polymer and (ii) from 12 wt % to 30 wt % oil. Weight percent is based on total weight of the top layer. The ethylene-based polymer is (i) an ethylene/$C_4$-$C_8$ α-olefin copolymer, (ii) an ethylene/$C_4$-$C_8$ α-olefin multi-block copolymer, and (iii) a combination of (i) and (ii).

The ethylene/$C_4$-$C_8$ α-olefin copolymer consists of (i) polymerized units of ethylene and (ii) polymerized units of a $C_4$-$C_8$ α-olefin comonomer. Nonlimiting examples of suitable ethylene/$C_4$-$C_8$ α-olefin copolymer include ethylene/butene copolymer, ethylene/hexene copolymer, and ethylene/octene copolymer.

In an embodiment, the ethylene/$C_4$-$C_8$ α-olefin copolymer resin is an ethylene/octene copolymer having one, some, or all of the following properties:

(i) a density from 0.857 g/cc to 0.880 g/cc, or from 0.865 g/cc to 0.875 g/cc; and/or (ii) a melt index (I2) from 0.5 g/10 min to 20 g/10 min, or from 1 g/10 min to 15 g/10 min, or from 3 g/10 min to 13 g/10 min; and/or (iii) a Shore A hardness value less than 80, or less than 75, or from 50 to 75, or from 60 to 75.

In an embodiment, the ethylene-based polymer is an ethylene/$C_4$-$C_8$ α-olefin multi-block copolymer. The term "ethylene/$C_4$-$C_8$ α-olefin multi-block copolymer" refers to an ethylene/$C_4$-$C_8$ α-olefin multi-block copolymer consisting of ethylene and one copolymerizable $C_4$-$C_8$ α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The $C_4$-$C_8$ α-olefin is selected from butene, hexene, and octene. The ethylene/$C_4$-$C_8$ α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: $(AB)_n$; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

In an embodiment, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains 50 wt % to 90 wt % ethylene, or 60 wt % to 85 wt % ethylene, or 65 wt % to 80 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/$C_4$-$C_8$ α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-Polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/$C_4$-$C_8$ α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/$C_4$-$C_8$ α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/$C_4$-$C_3$ α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/$C_4$-$C_8$ α-olefin multi-block copolymer of the present disclosure, especially those made in a continuous, solution polymerization reactor, possess a most probable distribution of block lengths. In one embodiment of this disclosure, ethylene/$C_4$-$C_8$ α-olefin multi-block copolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm>-2002.9+4538.5(d)-2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T>-0.1299\ \Delta H+62.81 \text{ for } \Delta H \text{ greater than zero and up to 130 J/g}$$

$$\Delta T\geq 48^\circ \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re>1481-1629(d); \text{ and/or}$$

(D) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of 1:1 to 9:1.

The ethylene/$C_4$-$C_8$ α-olefin multi-block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/$C_4$-$C_8$ α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

In an embodiment, the ethylene/$C_4$-$C_8$ α-olefin multi-block copolymer has hard segments and soft segments, is styrene-free, consists of only (i) ethylene and (ii) a $C_4$-$C_8$ α-olefin or $C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm>-2002.9+4538.5(d)-2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 125° C., or 130° C., or 135° C.

In an embodiment, the ethylene/$C_4$-$C_8$ α-olefin multi-block copolymer is an ethylene/1-octene multi-block copolymer (consisting only of ethylene and octene comonomer) and has one, some, or all of the following properties:

(i) a Mw/Mn from 1.7, or 1.8 to 2.2, or 2.5, or 3.5; and/or
(ii) a density from 0.857, 0.860 g/cc, or 0.865 g/cc, to 0.870 g/cc, or 0.877 g/cc, or 0.880 g/cc; and/or
(iii) a melting point, Tm, from 115° C., or 118° C., or 119° C., or 120° C. to 120° C., or 123° C., or 125° C.; and/or
(iv) a melt index (MI) from 0.1 g/10 min, or 0.5 g/10 min to 1.0 g/10 min, or 2.0 g/10 min, or 5 g/10 min, or 10 g/10 min; and/or
(v) from 50 to 85 wt % soft segment and from 40 to 15 wt % hard segment (based on total weight of the ethylene/octene multi-block copolymer); and/or
(vi) from 10 mol %, or 13 mol %, or 14 mol %, or 15 mol % to 16 mol %, or 17 mol %, or 18 mol %, or 19 mol %, or 20 mol %, or 25 mol % octene in the soft segment; and/or
(vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or
(viii) an elastic recovery (Re) from 50%, or 60% to 70%, or 80%, or 90%, at 300% $min^{-1}$ deformation rate at 21° C. as measured in accordance with ASTM D 1708; and/or
(ix) a polydisperse distribution of blocks and a polydisperse distribution of block sizes (hereafter referred to as multi-block copolymer properties (i)-(ix)).

In an embodiment, the ethylene/$C_4$-$C_8$ α-olefin multi-block copolymer is an ethylene/octene multi-block copolymer. The ethylene/octene multi-block copolymer is sold under the tradename INFUSE™, available from The Dow Chemical Company, Midland, Michigan, USA.

The ethylene/$C_4$-$C_8$ α-olefin multi-block copolymer can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893,166; and 7,947,793.

In an embodiment, the ethylene/$C_4$-$C_8$ α-olefin multi-block copolymer is an ethylene/octene multi-block copolymer having a density from 0.86 g/cc to 0.88 g/cc, a melt index from 0.5 g/10 min to 20 g/10 min, or from 1 g/10 min to 15 g/10 min, and a Shore A hardness value less than 80, or less than or equal to 75, or from 60 to 75.

(ii) Oil

The top layer includes from 12 wt % to 30 wt % of an oil in addition to the ethylene-based polymer. Weight percent is based on total weight of the top layer. The oil can be a mineral oil, an aromatic oil, a naphthenic oil, paraffinic oil, and a triglyceride-based vegetable oil (such as castor oil or soybean oil), a synthetic hydrocarbon oil (such as polypropylene oil), a silicone oil, and combinations thereof.

In an embodiment, the oil is a mineral oil. A "mineral oil," as used herein, is a colorless, odorless oil that is a mixture of $C_{15}$-$C_{40}$ alkanes. The mineral oil is present in the top layer to the exclusion of aromatic oil, naphthenic oil, paraffinic oil, triglyceride-based vegetable oil, synthetic hydrocarbon oil, silicone oil, and any combination thereof. The mineral oil is present in the top layer in an amount from 12 wt % to 30 wt %, or from 13 wt % to 27 wt %, or from 15 wt % to 25 wt %, based on total weight of the top layer.

B. Bottom Textile Layer

The present article includes a bottom textile layer in addition to the top layer. A "textile" is a flexible material composed of a network of natural fibers, artificial fibers, and combinations thereof. Textile includes fabric and cloth. The textile may be woven, nonwoven, knitted, plained, or spunbond. Nonlimiting examples of natural fiber include cotton, wool, hemp, silk, and combinations thereof. Nonlimiting examples of artificial fiber include polyesters (PET), polyamides (nylon), acrylics, polyolefins, polyurethane (e.g., a spandex material), polyvinyl chlorides, polyvinylidene chlorides, polyvinyl alcohols, and combinations thereof.

In an embodiment, the textile is a nonwoven textile.

In an embodiment, the textile is a microfiber nonwoven textile. A "microfiber" textile is a fabric containing fiber having a diameter not greater than 100 micrometers.

In an embodiment, the textile has a density from 0.20 g/cc, or 0.25 g/cc to 0.27 g/cc, or 0.30 g/cc, or 0.31 g/cc, or 0.32 g/cc, or 0.35 g/cc, or 0.40 g/cc, or 0.50 g/cc.

In an embodiment, the textile contains fibers having a size from 0.1 denier, or 0.3 denier, or 1 denier, or 2 denier, or 3 denier to 4 denier, or 5 denier, or 6 denier, or 7 denier, or 8 denier, or 9 denier, or 10 denier. In another embodiment, the textile contains fibers having a size equal to or less than 10 denier.

In an embodiment, the textile has a thickness from 0.5 mm, or 1.0 mm to 1.5 mm, or 2.0 mm.

In an embodiment, the textile is a nonwoven textile having one, some, or all of the following properties:

(a) a density from 0.20 g/cc, or 0.25 g/cc to 0.32 g/cc, or 0.35 g/cc; and/or
(b) a fiber size from 1 denier, or 3 denier to 5 denier; and/or
(c) a thickness from 0.5 mm, or 1.0 mm to 1.5 mm, or 2.0 mm.

In an embodiment, the textile is a fabric composed of polyester, polyethylene and/or polypropylene. The fabric is subjected to a pre-lamination treatment, e.g., corona surface treatment, impregnation, etc., and the top layer is heat laminated to the fabric such that the top layer directly contacts the bottom layer such that no intervening layers or no intervening structures are present between the top layer and the bottom layer.

The textile may comprise two or more embodiments disclosed herein.

In an embodiment, the article contains (A) a top layer and (B) a bottom layer containing a textile. The top layer directly contacts the bottom layer. The (A) top layer contains (i) from 80 wt % to 88 wt % of ethylene/$C_4$-$C_8$ α-olefin copolymer, and (ii) from 12 wt % to 20 wt % of the oil. The ethylene/$C_4$-$C_8$ α-olefin copolymer has a density from 0.86 g/cc to 0.88 g/cc, a melt index from 0.5 g/10 min to 20 g/10 min, and a Shore A value less than 75. The oil is mineral oil to the exclusion of any other type of oil. The top layer has a bally flex resistance value greater than 86,000, or from 87,000 to 150,000, or from 90,000 to 140,000. In a further embodiment, the composition of the top layer (A) has a melt index from 2 g/10 min to 10 g/10, min and a Shore A hardness value from 60 to less than 75.

In an embodiment, the article contains (A) a top layer and (B) a bottom layer containing a textile. The top layer directly contacts the bottom layer. The top layer contains (i) from 30 wt % to 50 wt %, or 35 wt % to 45 wt % of an ethylene/$C_4$-$C_8$ α-olefin multi-block copolymer, (ii) from 30 wt % to 50 wt %, or 35 wt % to 45 wt % of an ethylene/$C_4$-$C_8$ α-olefin copolymer, and (iii) from 12 wt % to 30 wt %, or from 15 wt % to 25 wt % of the oil. It is understood that the ethylene/$C_4$-$C_8$ α-olefin multi-block copolymer, the ethylene/$C_4$-$C_8$ α-olefin copolymer, and the oil amount to 100 wt % of the top layer. The ethylene/$C_4$-$C_8$ α-olefin multi-block copolymer has a density from 0.86 g/cc to 0.88 g/cc, a melt index from 0.5 g/10 min to 20 g/10 min, and a Shore A value from 60 to less than or equal to 75. The top layer has a bally flex resistance value greater than 86,000, or from 87,000 to 150,000, or from 90,000 to 140,000. In an further embodiment, the top layer has a melt index from 2 g/10 min to 10 g/10 min and a Shore A hardness value less than 80, or from 60 to less than 75.

C. Middle Foam layer

In an embodiment, the article includes a middle foam layer in addition to the top layer and the bottom layer. The middle layer is located between the top layer and the bottom layer. The middle foam layer directly contacts the top layer and/or the bottom layer. In an embodiment, the middle foam layer directly contacts the top layer and directly contacts the bottom layer. The middle foam layer is composed of a composition that includes (i) from 70 wt % to 90 wt %, or from 70 wt % to 88 wt % of an ethylene-based polymer, and (ii) from from 10 wt % to 30 wt %, or from 12 wt % to 30 wt % of an oil based on the total weight of the middle foam layer.

In an embodiment, the middle foam layer is prepared by blending or compounding the individual components with one another in any conventional mixing apparatus, e.g., Banbury kneader or any suitable extruder, under conditions and for a time that produces a substantially homogeneous mixture, calendering the mixture using conventional equipment and conditions to form a sheet, and then heat laminating the sheet to the top layer and/or bottom textile layer using conventional lamination equipment and conditions. The middle foam layer is typically not subjected to foaming conditions until after it is laminated to the top layer (A) and the bottom textile layer (B). The foaming conditions are such that very fine and regular cells are formed throughout the middle foam layer. Typical foaming conditions include an oven temperature of 200° C. or more and an oven residence time of 60-120 seconds. The foam efficiency [i.e., the ratio of expanded volume to original (non-expanded) volume] is based on the thickness ratio, and it is typically from 1.5 to 5, or from 2 to 3.

In an embodiment, the article contains (A) a top layer and (B) a bottom layer containing a textile, and (C) a middle foam layer. The middle foam layer (C) is between the top layer (A) and the bottom textile layer (B). The top layer (A) directly contacts the middle foam layer (C) and the middle foam layer (C) directly contacts the bottom layer. The top layer (A) and the middle foam layer (C) each contain (i) from 70 wt % to 90 wt %, or from 80 wt % to 88 wt % of ethylene/$C_4$-$C_8$ α-olefin copolymer, and (ii) from from 10 wt % to 30 wt %, or from 12 wt % to 20 wt % of the oil. The ethylene/$C_4$-$C_8$ α-olefin copolymer in the top layer (A) and in the middle foam layer (C) can be the same or can be different. The ethylene/$C_4$-$C_8$ α-olefin copolymer in the top layer (A) and in the middle foam layer (C) each has a density from 0.86 g/cc to 0.88 g/cc, a melt index from 0.5 g/10 min to 20 g/10 min, and a Shore A value less than or equal to 75. The oil in the top layer (A) and the oil in the middle foam layer (C) is mineral oil to the exclusion of any other type of oil. The amount of oil in the top layer and the amount of oil in the middle foam layer can be the same or different. The top layer (A) and the foam layer (C) each has a bally flex resistance value greater than 86,000, or from 87,000 to 150,000, or from 90,000 to 140,000. In a further embodiment, the composition of the top layer (A) and the foam in the middle layer (C) each has a melt index from 2 g/10 min to 10 g/10, min and a Shore A hardness value from 60 to less than 75.

In an embodiment, the article contains (A) a top layer and (B) a bottom layer containing a textile, and (C) a middle foam layer. The middle foam layer (C) is between the top layer (A) and the bottom textile layer (B). The top layer (A) directly contacts the middle foam layer (C) and the middle foam layer (C) directly contacts the bottom layer. The top layer (A) and the middle foam layer (C) each contain (i) from 30 wt % to 50 wt %, or from 35 wt % to 45 wt % of an ethylene/$C_4$-$C_8$ α-olefin multi-block copolymer, (ii) from 30 wt % to 50 wt %, or from 35 wt % to 45 wt % of an ethylene/$C_4$-$C_8$ α-olefin copolymer, and (iii) from 10 wt % to 30 wt %, or from 12 wt % to 30 wt %, or from 15 wt % to 25 wt % of the oil. It is understood that the ethylene/$C_4$-$C_8$ α-olefin multi-block copolymer, the ethylene/$C_4$-$C_8$ α-olefin copolymer, and the oil amount to 100 wt % of the top layer (A). It is understood that the ethylene/$C_4$-$C_8$ α-olefin multi-block copolymer, the ethylene/$C_4$-$C_8$ α-olefin copolymer, and the oil amount to 100 wt % of the middle foam layer (C). The ethylene/$C_4$-$C_8$ α-olefin multi-block copolymer in the top layer (A) and ethylene/$C_4$-$C_8$ α-olefin multi-block copolymer in the middle foam layer (C) can be the same or can be different. The amount of oil in the top layer and the amount of oil in the middle foam layer can be the same or different. The ethylene/$C_4$-$C_8$ α-olefin multi-block copolymer in the top layer (A) and ethylene/$C_4$-$C_8$ α-olefin multi-block copolymer in the middle layer (C) each has a density from 0.86 g/cc to 0.88 g/cc, a melt index from 0.5 g/10 min to 20 g/10 min, a Shore A value from 60 to less than or equal to 75. The top layer (A) has a bally flex resistance value greater than 86,000, or from 87,000 to 150,000, or from 90,000 to 140,000. In a further embodiment, the composition of the top layer (A) and the foam in the middle layer (C) each has a melt index from 2 g/10 min to 10 g/10, min and a Shore A hardness value from 60 to less than 75.

D. Additives

The top layer and/or the middle foam layer may include one or more optional additives. Nonlimiting examples of suitable additives include antioxidants, curing agents, cross linking co-agents, boosters and retardants, processing aids, ultraviolet absorbers or stabilizers, antistatic agents, nucleating agents, slip agents, plasticizers, lubricants, viscosity control agents, tackifiers, anti-blocking agents, surfactants, acid scavengers, pigments and/or dyes, and metal deactivators. When present the additive(s) is present in the amount from 0.01 wt % to less than 10 wt %, or from 0.1 wt % to less than 5 wt %, or from 0.1 wt % to less than 1.0 wt %, based on the total weight of each respective individual layer—the top layer and/or the middle foam layer.

In an embodiment, the two-layer article with top layer (A) and bottom textile layer (B) and/or the three-layer article with top layer (A), bottom textile layer (B), and middle foam layer (C) further includes a primer layer and a top coating layer. The primer layer directly contacts the top layer and the top coating layer directly contacts the primer layer, such that the top coating layer is the outermost layer of the article. The primer layer is formed by applying a primer (e.g., chlorinated polypropylene (CPP), to the top layer. A polyurethane, is subsequently applied to the primer layer. The bottom textile layer sustains the shaping of article (i.e. the synthetic leather), and provides mechanical properties for the article. The bottom textile layer also provides stability for the foaming of the middle foam layer (when present). The middle foam layer, when present, provides flexibility, cushioning, softness, thermal insulating, light weight and hand feel to the article's multilayer structure. The top layer provides protection against UV-radiation, heat and other weathering factors. The top layer may also carry visible functionalities such as print, embossment, color and/or gloss. The purpose of the top coating layer is to provide protection to the top layer and to protect the article from scratches, mars and abrasion; to provide a surface for text and designs; and to impart an aesthetically pleasing finish to the article. The purpose of the primer layer is to facilitate the attachment of the top coating layer to the top layer.

Bally flex resistance is an important feature for synthetic leather products; bally flex resistance being a characterization of durability and mechanical fatigue during cyclic flexural stress. Applicant discovered that the addition of 12 wt % to 30 wt % mineral oil to (i) ethylene/$C_4$-$C_8$ $\alpha$-olefin copolymer and/or to (ii) ethylene/$C_4$-$C_8$ $\alpha$-olefin multi-block copolymer in the top layer and/or the addition of 10 wt % to 30 wt %, or 12 wt % to 30 wt % oil in the middle foam layer of a synthetic leather article unexpectedly improves (increases) bally flex resistance values for POE synthetic leather that meet, or exceed, bally flex resistance values for comparable PU synthetic leather structures and/or PVC synthetic leather structures. The addition of 12 wt % to 30 wt % mineral oil to (i) ethylene/$C_4$-$C_8$ $\alpha$-olefin copolymer and/or to (ii) ethylene/$C_4$-$C_8$ $\alpha$-olefin multi-block copolymer in the top layer also maintains the melt index of the composition in the range of from 2 g/10 min to 10 g/10 min which is necessary for maintaining a melt viscosity suitable for process operations such as calendaring and extrusion casting; a MI of 2-10 g/10 min enables surface smoothness and efficient production rates.

The present article finds many useful applications as a synthetic leather (i.e., a POE-leather). Hence, nonlimiting examples of the present article include clothing (shirt, blouse, slacks, skirt, dress, coat, jacket, shoes, boots, hat), purse, luggage, automobile interiors (automobile seat, interior door panels, dashboard), and furniture (chair, sofa).

By way of example, and not limitation, some embodiments of the present disclosure will now be described in detail in the following Examples.

EXAMPLES

Materials used in the inventive examples and comparative samples are provided in Table 1 below.

TABLE 1

| Materials | | | |
|---|---|---|---|
| Material | Product Name | Properties | Source |
| Ethylene/octene multi-block copolymer | INFUSE ™ 9100 | density 0.877 g/$cm^3$<br>MI 1.0 g/10 min<br>Shore A = 75 | Dow |
| Ethylene/octene multi-block copolymer | INFUSE ™ 9107 | density 0.866 g/$cm^3$<br>MI 1.0 g/10 min<br>Shore A = 60 | Dow |
| Ethylene/octene multi-block copolymer | INFUSE ™ 9500 | density 0.877 g/$cm^3$<br>MI 5 g/10 min<br>Shore A = 69 | Dow |
| Ethylene/octene copolymer | ENGAGE ™ 8452 | density 0.875 g/$cm^3$<br>MI 3 g/10 min<br>Shore A = 74 | Dow |
| Ethylene/octene copolymer | ENGAGE ™ 8100 | density 0.87 g/$cm^3$<br>MI 1 g/10 min<br>Shore A = 73 | Dow |
| Ethylene/octene copolymer | ENGAGE ™ 8407 | density 0.87 g/$cm^3$<br>MI 30 g/10 min<br>Shore A = 72 | Dow |
| Ethylene/octene copolymer | ENGAGE ™ 8200 | density 0.87 g/$cm^3$<br>MI 5 g/10 min<br>Shore A = 66 | Dow |
| Ethylene/octene copolymer | ENGAGE ™ 8180 | density 0.863 g/$cm^3$<br>MI 0.5 g/10 min<br>Shore A = 63 | Dow |
| Ethylene/octene copolymer | ENGAGE ™ 8137 | density 0.864 g/$cm^3$<br>MI 13 g/10 min<br>Shore A = 63 | Dow |
| Mineral oil | KP6030 | Viscosity 623 $mm^2$/s at 40° C., 33 $mm^2$/s at 100° C. by GB/T 265 | Karamay Petrochemical of CNPC |
| Mineral oil | FORMOSA base oil 150N | Viscosity 5.3 $mm^2$/s at 100° C. | Formosa Petrochemical Corporation |

Brabender mixing and compression molding.

For examples without chemical blowing agent (CBA): POE resins were fed into a Brabender mixer at a set temperature of 150° C. with a rotor speed of 30 rpm. After two minutes, the resins were homogeneously heated and melted. Afterwards, all other ingredients, were weighed and gradually added into the chamber. The mixing was continued at 50 rpm for another six minutes.

For the samples containing CBA, the chamber temperature was set at 130° C. The mixing was conducted at 35 rpm for about 6 minutes. The final melt temperature was controlled and held below 145° C. The compound was collected and pressed into a flat pie shape for the following use.

The compounds from Brabender mixing were compression molded into a plaque in a 1.1 mm thick mold. The compounds were preheated at 150° C. for 5 minutes and then degassed, followed by another two minute pressing process at 150° C. The plaques were taken out from the mold after ramping down to room temperature. The obtained plaques were further cut into required shape and size for bally flex test and DMS analysis or into pellets for melt index measurement.

For samples containing CBA: first compression mold film of 0.5 mm thickness, and then foamed the film at 220° C. for 90 seconds in air-circulating oven into foam plaque for bally flex test.

Table 2 Composition and performance of Inventive examples (IE) and Comparative samples (CS)

TABLE 2A

| Compositions for Top Layer | | | | | | | | | | | | | | | |
|---|---|---|---|---|---|---|---|---|---|---|---|---|---|---|---|
| Materials | CS1 | IE1 | CS2 | CS3 | IE2 | CS4 | CS5 | IE3 | IE4 | IE5 | CS6 | CS7 | CS8 | IE6 | CS9 |
| INFUSE 9100 | 100 | 83 | 50 | | | | 50 | 40 | 37.5 | 37.5 | 25 | 25 | | | |
| Engage 8452 | | | | 100 | 85 | 75 | | | | | | | | | |
| ENGAGE 8100 | | | | | | | 50 | 40 | 37.5 | 37.5 | 25 | 25 | | | |
| Engage 8407 | | | | | | 25 | | | | | 50 | | | | |
| Engage 8200 | | | | | | | | | | | | 50 | | | |
| Infuse 9107 | | | | | | | | | | | | | 50 | 40 | 30 |
| Engage 8180 | | | | | | | | | | | | | 50 | 40 | 30 |
| Engage 8137 | | | | | | | | | | | | | | | 40 |
| INFUSE 9500 | | | 50 | | | | | | | | | | | | |
| Oil KP6030 | | 17 | | | 15 | | | 20 | 25 | | | | | 20 | |
| Oil 150N | | | | | | | | | | 25 | | | | | |
| Bally flex cycles | 67K | 90K | 12K | 94K | >100K | 32K | 90K | 100K | >100K | >140K | 15K | 58K | 86K | >100K | 32K |
| MI (2.16 kg, 190 C.) | 1.0 | 2.2 | 2.0 | 3.0 | 6.5 | 4.9 | 1.0 | / | 3.6 | 4.5 | 4.1 | 2.2 | 0.7 | / | / |
| Hardness, Shore A 1 kg load, 5 s | | | | | | | 75 | 63 | | | | | 64 | 54 | |

TABLE 2B

| Compositions for Middle Foam Layer | | | |
|---|---|---|---|
| Materials | CS10 | IE7 | IE8 |
| Engage 8100 | 50 | 45 | 40 |
| Infuse 9100 | 50 | 45 | 40 |
| Oil 6030 | | 10 | 20 |
| AC 3000 Blowing Agent | | 1.5 phr | 1.5 phr |
| Zinc Stearate | | 0.4 phr | 0.4 phr |
| Bally flex cycles of foam specimen 1 (Expansion ratio, ER) | 95k (RE 2.75) | >100k (ER 2.76) | >100k (ER 3.33) |
| Bally flex cycles of foam specimen 2 (Expansion ratio, ER) | 100k (ER 3.20) | >100k ER 2.72) | 100k (ER 3.04) |

Table 2A shows inventive examples (IE) IE1-IE6 for top layer compositions composed of (i) one or more ethylene-based polymers and (ii) from 12 wt % to 30 wt % mineral oil. Table 2A also shows comparative samples (CS) CS1-CS9 composed of one or more ethylene-based polymers and no oil. In Table 2A, IE1-IE6 show that the addition of 12-30 wt % of mineral oil to a complimentary amount (88-70 wt %) of one or more ethylene/$C_4$-$C_8$ $\alpha$-olefin copolymers (to 100 wt %) unexpectedly yields a composition with an improved bally flex resistance, the bally flex resistance value being greater than 86,000, and an improved MI; i.e., an MI greater than 2.0 g./10 min. Compositions with MI greater than 2.0 g/10 min are necessary for suitable flexibility during extrusion or calendaring processing. CS1 to CS9 are not able to achieve both a bally flex resistance value greater than 86,000 and an MI greater than 2.0. DMS was further used to characterize the flowability of examples in a broad shear rate range, as shown in FIG. 1. As shown in FIG. 1, IE3 has a lower viscosity (i.e., higher flowability) compared to CS7. Furthermore, IE3 also has a greater bally flex resistance value (100k) compared to CS7 (58k), which indicates that adding oil is more effective than blending high MI resin to achieve simultaneously both good bally flex resistance value (greater than 86,000) and high flowability (MI greater than 2.0 g/10 min) for processability.

In Table 2B, IE7-IE8 and CS10 chemical blowing agent was added into the composition to make a foamed thin plaque, which can be used to mimic the middle foam layer of a typical synthetic leather structure. The bally flex resistance value of the foamed plaques with similar expansion ratio (ER) demonstrated that the addition of from 10 wt % to 30 wt %, or from 12 wt % to 30 wt %, mineral oil maintains the bally flex resistance value compared to foamed plaques without oil. Consequently the 10-30 wt % oil addition to the middle foam layer composition of synthetic leather can be used to maintain bally flex resistance and improve processability (by increasing MI of the foam composition to greater than 2.0 g/10 min).

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. An article comprising:

A. a top layer composed of a composition comprising (i) from 70 wt % to 88 wt % of an ethylene-based polymer, (ii) from 12 wt % to 30 wt % of an oil, based on the total weight of the top layer;

(iii) from 0 wt % to 5 wt % optional additives selected from the group consisting of antioxidants, curing agents, boosters, retardants, processing aids, ultraviolet absorbers, stabilizers, antistatic agents, slip agents, plasticizers, lubricants, viscosity control agents, tackifiers, anti-blocking agents, surfactants, acid scavengers, pigments, dyes, metal deactivators, and combinations thereof, and (i), (ii), and (iii) amount to 100 wt % of the top layer; and B. a bottom layer comprising a textile.

2. The article of claim 1 wherein the ethylene-based polymer is selected from the group consisting of an ethylene/C4-C8 $\alpha$-olefin copolymer, an ethylene/C4-C8 $\alpha$-olefin multi-block copolymer, and combinations thereof.

3. The article of claim 2 wherein the ethylene-based polymer is an ethylene/C4-C8 $\alpha$-olefin copolymer having a density from 0.857 g/cc to 0.88 g/cc;

a melt index from 0.5 g/10 min to 20 g/10 min; and a Shore A value less than or equal to 75.

4. The article of claim 2 wherein the ethylene-based polymer is an ethylene/C4-C8 $\alpha$-olefin multi-block copolymer having a density from 0.857 g/cc to 0.88 g/cc;
a melt index from 0.5 g/10 min to 20 g/10 min; and
a Shore A value less than or equal to 75.

5. The article of claim 1 wherein the top layer comprises
from 80 wt % to 87 wt % of the ethylene/C4-C8 α-olefin copolymer;
from 13 wt % to 20 wt % of the oil; and
the top layer has a bally flex resistance value greater than 86,000.

6. The article of claim 1 wherein the top layer comprises
from 30 wt % to 50 wt % of an ethylene/C4-C8 α-olefin multi-block copolymer;
from 30 wt % to 50 wt % of an ethylene/C4-C8 α-olefin copolymer;
from 13 wt % to 30 wt % of the oil; and
the top layer has a bally flex resistance value greater than 86,000.

7. The article of claim 5 wherein the composition of the top layer has a melt index from greater than 2 g/10 min to 10 g/10 min.

8. The article of claim 5 wherein the composition of the top layer has a Shore A value less than 80.

9. The article of claim 1 comprising
C. A middle foam layer composed of a composition comprising
(i) an ethylene-based polymer; and
(ii) from 10 wt % to 30 wt % of an oil based on the total weight of the middle foam layer.

10. The article of claim 9 wherein the ethylene-based polymer in the middle foam layer is selected from the group consisting of an ethylene/α-olefin copolymer, an ethylene/a-olefin multi-block copolymer, and combinations thereof.

11. The article of claim 10 wherein the ethylene-based polymer in the middle foam layer is an ethylene/C4-C8 α-olefin copolymer having
a density from 0.857 g/cc to 0.88 g/cc;
a melt index from 0.5 g/10 min to 20 g/10 min; and
a Shore A value less than or equal to 75.

12. The article of claim 10 wherein the ethylene-based polymer in the middle foam layer is an ethylene/C4-C8 α-olefin multi-block copolymer having
a density from 0.857 g/cc to 0.88 g/cc;
a melt index from 0.5 g/10 min to 20 g/10 min; and
a Shore A value less than or equal to 75.

13. The article of claim 9 wherein the middle foam layer comprises
from 80 wt % to 87 wt % of the ethylene/C4-C8 α-olefin copolymer;
from 10 wt % to 20 wt % of the oil; and
the middle foam layer has a bally flex resistance value greater than 60,000.

14. The article of claim 9 wherein the middle foam layer comprises
from 30 wt % to 50 wt % of an ethylene/C4-C8 α-olefin multi-block copolymer;
from 30 wt % to 50 wt % of an ethylene/C4-C8 α-olefin copolymer;
from 10 wt % to 30 wt % of the oil; and
the middle foam layer has a bally flex resistance value greater than 86,000.

15. The article of claim 1 wherein the oil is a mineral oil to the exclusion of any other type of oil.

16. The article of claim 1 wherein the top layer is void of a propylene-based polymer.

* * * * *